(12) United States Patent
Sellers et al.

(10) Patent No.: US 11,897,373 B2
(45) Date of Patent: *Feb. 13, 2024

(54) CAR SEAT AND METHOD FOR FASTENING A CAR SEAT TO A VEHICLE

(71) Applicant: Wonderland Switzerland AG, Steinhausen (CH)

(72) Inventors: Gregory Sellers, Christiana, PA (US); Curtis M. Hartenstine, Birdsboro, PA (US)

(73) Assignee: WONDERLAND SWITZERLAND AG, Steinhausen (CH)

(*) Notice: Subject to any disclaimer, the term of this patent is extended or adjusted under 35 U.S.C. 154(b) by 0 days.

This patent is subject to a terminal disclaimer.

(21) Appl. No.: 18/163,552

(22) Filed: Feb. 2, 2023

(65) Prior Publication Data

US 2023/0182624 A1 Jun. 15, 2023

Related U.S. Application Data

(63) Continuation of application No. 17/147,475, filed on Jan. 13, 2021, now Pat. No. 11,571,994, which is a
(Continued)

(51) Int. Cl.
*B60N 2/00* (2006.01)
*B60N 2/28* (2006.01)

(52) U.S. Cl.
CPC ......... *B60N 2/2806* (2013.01); *B60N 2/2863* (2013.01); *B60N 2/2872* (2013.01); *B60N 2/2884* (2013.01); *B60N 2/2818* (2023.08)

(58) Field of Classification Search
CPC ............... B60N 2/2863; B60N 2/2806; B60N 2002/2818; B60N 2/2803; B60N 2/28;
(Continued)

(56) References Cited

U.S. PATENT DOCUMENTS 3,547,489 A 12/1970 Grieser
4,718,722 A 1/1988 Kassai
(Continued)

FOREIGN PATENT DOCUMENTS

CA 2438553 A1 2/2004
CA 2518222 A1 9/2004
(Continued)

*Primary Examiner* — Chi Q Nguyen
(74) *Attorney, Agent, or Firm* — CANTOR COLBURN LLP

(57) ABSTRACT

A car seat configured to be fastened to a vehicle, includes a seat shell and a belt guide disposed at the seat shell to redirect a belt set of the vehicle for rerouting the belt set along a deviation path from an original path. When the belt set is not engaged with the belt guide, the belt set is routed along the original path. When the belt set is engaged with the belt guide, the belt set is routed along the deviation path from the original path. The rerouted belt set improves the symmetry of forces encountered by the vehicle and also improves the kinetics of the car seat during a crash. A break-away feature in the belt guide advantageously absorbs forces at different times during a crash.

10 Claims, 12 Drawing Sheets

Related U.S. Application Data continuation of application No. 16/384,897, filed on Apr. 15, 2019, now Pat. No. 10,919,418.

(60) Provisional application No. 62/659,355, filed on Apr. 18, 2018.

(58) Field of Classification Search
CPC ... B60N 2/2809; B60N 2/2884; B60N 2/2872
USPC ......... 297/216.1, 464, 483, 253, 468, 250.1, 297/475, 474, 473, 486, 238
See application file for complete search history.

(56) References Cited

U.S. PATENT DOCUMENTS

| | | | |
|---|---|---|---|
| 4,874,203 A | 10/1989 | Henley | |
| 4,936,627 A | 6/1990 | Guim | |
| 5,052,750 A | 10/1991 | Takahashi et al. | |
| 5,722,724 A | 3/1998 | Takei et al. | |
| 5,842,740 A | 12/1998 | Lefranc | |
| 6,509,653 B2 | 1/2003 | Fujimoto et al. | |
| 7,070,239 B1 | 7/2006 | Ugrekhelidze et al. | |
| 7,159,941 B2 | 1/2007 | Thomas | |
| 7,344,192 B2* | 3/2008 | Kespohl | B60N 2/2878 297/256.13 |
| 7,387,315 B2 | 6/2008 | Nett et al. | |
| 7,997,647 B2 | 8/2011 | Sjoquist et al. | |
| 10,632,870 B1* | 4/2020 | Radion | B60R 22/024 |
| 10,919,418 B2 | 2/2021 | Sellers et al. | |
| 2003/0197415 A1* | 10/2003 | Dingman | B60N 2/2893 297/468 |
| 2004/0061323 A1* | 4/2004 | Xu | B60R 22/20 280/801.1 |
| 2004/0155451 A1* | 8/2004 | Xu | B60R 22/30 280/808 |
| 2006/0091709 A1 | 5/2006 | Emmert | |
| 2006/0181125 A1* | 8/2006 | Kespohl | B60N 2/2878 297/256.16 |
| 2008/0100122 A1* | 5/2008 | Bell | B60N 2/688 297/468 |
| 2009/0091115 A1* | 4/2009 | Bell | B60R 22/20 280/801.2 |
| 2010/0123342 A1 | 5/2010 | Mostert et al. | |
| 2011/0109137 A1* | 5/2011 | Tamanouchi | B60N 2/2863 297/250.1 |
| 2012/0326477 A1* | 12/2012 | Biaud | B60N 2/2851 297/250.1 |
| 2013/0162001 A1 | 6/2013 | Dignitti et al. | |
| 2014/0132045 A1 | 5/2014 | Brady et al. | |
| 2015/0130235 A1 | 5/2015 | Herut | |
| 2015/0183341 A1 | 7/2015 | Carpenter | |
| 2016/0023579 A1 | 1/2016 | Balensiefer, II et al. | |
| 2016/0264025 A1 | 9/2016 | Sumroy | |
| 2017/0120783 A1* | 5/2017 | Denbo | B60N 2/2821 |
| 2019/0193604 A1* | 6/2019 | Kaiser | B60N 2/2806 |
| 2019/0217751 A1* | 7/2019 | Kaiser | B60N 2/2824 |
| 2020/0101875 A1 | 4/2020 | Kim et al. | |
| 2021/0129714 A1 | 5/2021 | Sellers et al. | |

FOREIGN PATENT DOCUMENTS

| | | |
|---|---|---|
| CA | 2523217 A1 | 10/2006 |
| CN | 2813355 Y | 9/2006 |
| CN | 101421135 A | 4/2009 |
| CN | 202623985 U | 12/2012 |
| CN | 103153696 A | 6/2013 |
| DE | 3231263 A1 | 2/1984 |
| DE | 29510641 U1 | 5/1996 |
| FR | 2658458 A1 | 8/1991 |
| JP | 201256380 A | 3/2012 |
| WO | 2007107881 A1 | 9/2007 |
| WO | 2012053420 A1 | 4/2012 |

* cited by examiner

CAR SEAT AND METHOD FOR FASTENING A CAR SEAT TO A VEHICLE

CROSS REFERENCE TO RELATED APPLICATIONS

This is a continuation of U.S. patent application Ser. No. 17/147,475 filed Jan. 13, 2021, now U.S. Pat. No. 11,571,994, which is a continuation application of U.S. patent application Ser. No. 16/384,897, which is filed on Apr. 15, 2019, now U.S. Pat. No. 10,919,418, and claims the benefit of U.S. Provisional Patent Application No. 62/659,355, filed on Apr. 18, 2018, and the contents of this application are incorporated herein by reference.

BACKGROUND OF THE INVENTION

1. Field of the Invention

The invention relates to a car seat used to protect children during transport within a vehicle and a related method, and more particularly, to a car seat designed to accommodate younger children in the rearward facing direction and a method for fastening a car seat to a vehicle.

2. Description of the Prior Art

There are many different designs used for rearward facing car seats and convertible car seats, but all have similar goals. The primary goal of every car seat is to keep its young occupant as safe as possible, especially in the case of a vehicular accident. To accomplish this, many designs strive to reduce the forces a child may experience during a crash. How this is achieved varies greatly among designs.

Some designs rely on one focal location, determined by how the vehicle belts interact with the car seat, to absorb unwanted forces. Vehicles that use the lap belt alone to secure the car seat typically apply symmetrical forces to the occupant in the event of vehicle collision. Vehicles with both a lap belt and a shoulder belt can present a challenge to the design of car seats because the angled shoulder belt inherently creates an asymmetrical distribution of forces that can interact with the occupant differently. To counteract this asymmetry, many designs include features that may increase the weight, complexity, and unsightly features of the car seat.

SUMMARY OF THE INVENTION

It is an objective to provide a safe environment for its occupant by redirecting the forces of a belt set of a vehicle advantageously away from the occupant.

The invention features a deviation of the belt set that is aesthetically subtle while remaining effective and the ability to reduce the forces experience by an occupant without significantly increasing the weight or complexity of the car seat.

It is also an objective to improve the symmetry of force distribution on the car seat through a redirection of the belt set. The inherent asymmetry of the belt set is mitigated by creating a new path for it on the car seat.

It is also an objective to provide a car seat that can reduce the forces experience by the occupant in the lateral direction and also reduce load applied to the focal belt path opening on the car seat with reduced or simplified structural components needed at the belt path opening.

The invention also features a break-away design of rerouting the belt set. This design makes it possible to absorb forces at different times throughout the event of a crash which leads to a more symmetrical distribution of forces on the car seat.

It is advantageous of the invention that the break-away design allows for initial force of a vehicular collision to be largely redirected by the features provided by the invention instead of relying solely on the car seat frame. The break-away design can be reset in the case of an accidental overload through normal use by the consumer.

The invention also features the symbiotic relationship of a break-away design and a permanent belt guide attachment. These attachments are encountered consecutively with a length of slack allowed after the initial break-away before the permanent attachment, or hard stop, is relied upon.

According to an embodiment of the present invention, a car seat configured to be fastened to a vehicle, includes a seat shell and a belt guide disposed at the seat shell to redirect a belt set of the vehicle for rerouting the belt set along a deviation path from an original path, wherein when the belt set through the seat shell is not engaged with the belt guide, the belt set is routed along the original path, and when the belt set through the seat shell is engaged with the belt guide, the belt set is routed along the deviation path from the original path.

According to an embodiment of the present invention, the belt guide is fixed at the seat shell. An open channel is formed between the belt guide and the seat shell, and the belt set is slipped in the open channel and redirected by the belt guide for rerouting the belt set along the deviation path from the original path.

According to an embodiment of the present invention, the belt guide is a rigid structure made by injection molding.

According to an embodiment of the present invention, the belt guide is anchored to the seat shell via a webbing.

According to an embodiment of the present invention, the belt guide includes a receiving slot and two support beams where a slit is formed between the two support beams and provided as a channel for the receiving slot, wherein the belt set is slipped through the slit, contained in the receiving slot, and redirected by the belt guide for rerouting the belt set along the deviation path from the original path.

According to an embodiment of the present invention, the belt guide is made by injection molding where the two support beams provide a break-away structure breakable at a predetermined force.

According to an embodiment of the present invention, the belt guide is a rigid structure with an open slot, wherein the belt set is slipped and contained in the opened slot and redirected by the belt guide for rerouting the belt set along the deviation path from the original path.

According to an embodiment of the present invention, the webbing includes a rigid member connected to the seat shell and a sacrificial sew line between the rigid member and the belt guide, and the sacrificial sew line being breakable at a predetermined force to create a length of slack before a hard-stop is encountered.

According to an embodiment of the present invention, the belt guide is made of metal.

According to an embodiment of the present invention, the car seat further includes a sacrificial break-away tab fixed at the seat shell. The webbing is sewed to the break-away tab to form a slack section between the break-away tab and a riveted end of the webbing, and the break-away tab being breakable at a predetermined force to let out the slack section before a hard-stop is encountered.

According to an embodiment of the present invention, the break-away tab is made by injection molded plastic and includes a notch cut in the center where the webbing is sewed to the center of the break-away tab.

According to an embodiment of the present invention, a method for fastening a car seat to a vehicle, includes at least following steps: configuring a belt guide disposed on a seat shell of the car seat; and using the belt guide to redirect a belt set of the vehicle for rerouting the belt set along a deviation path from an original path, wherein when the belt set through the seat shell is not engaged with the belt guide, the belt set is routed along the original path, and when the belt set through the seat shell is engaged with the belt guide, the belt set is routed along the deviation path from the original path.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
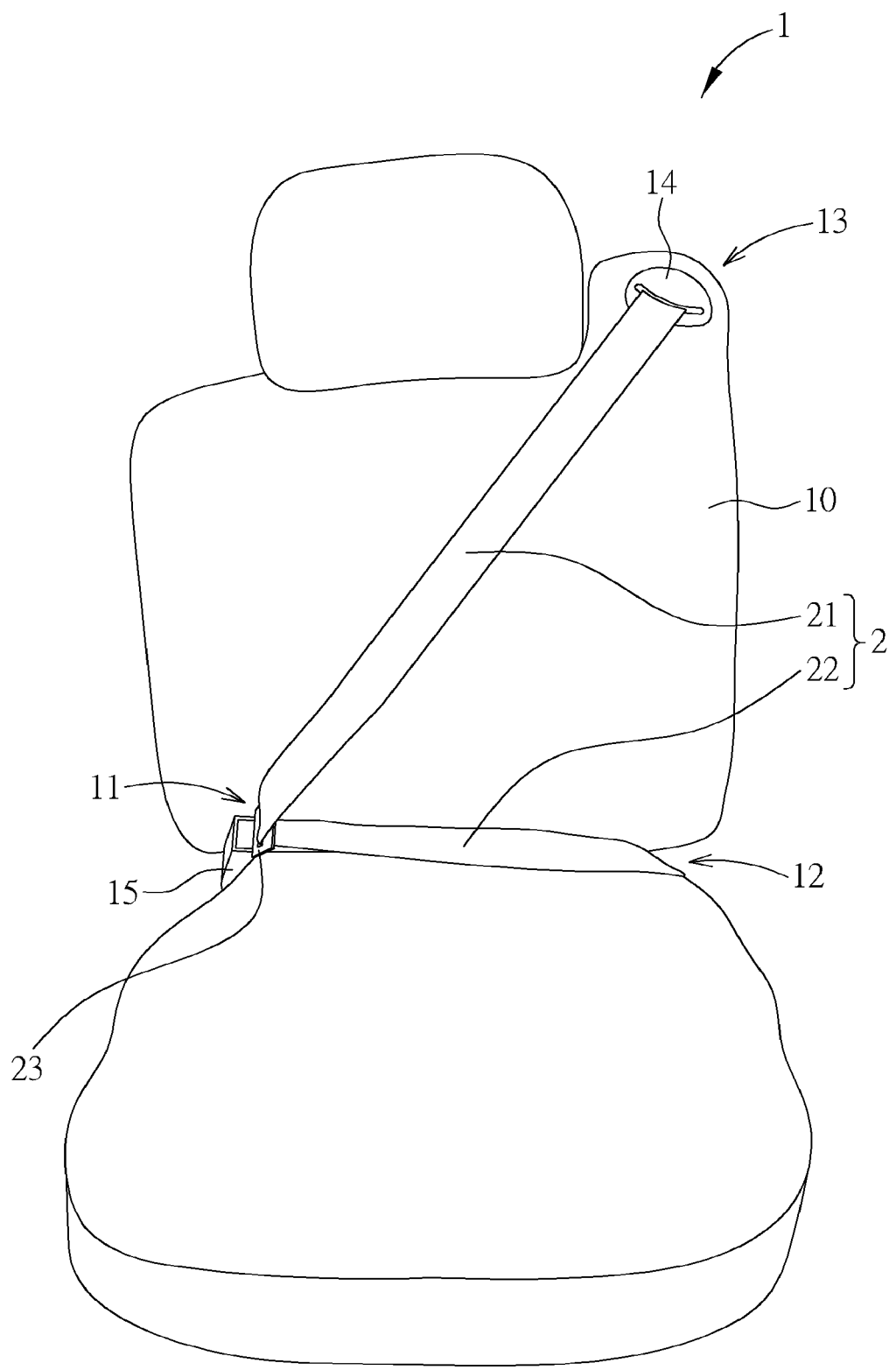
FIG. 1 is a front view of a vehicle seat with a seat belt.
Figure 2:
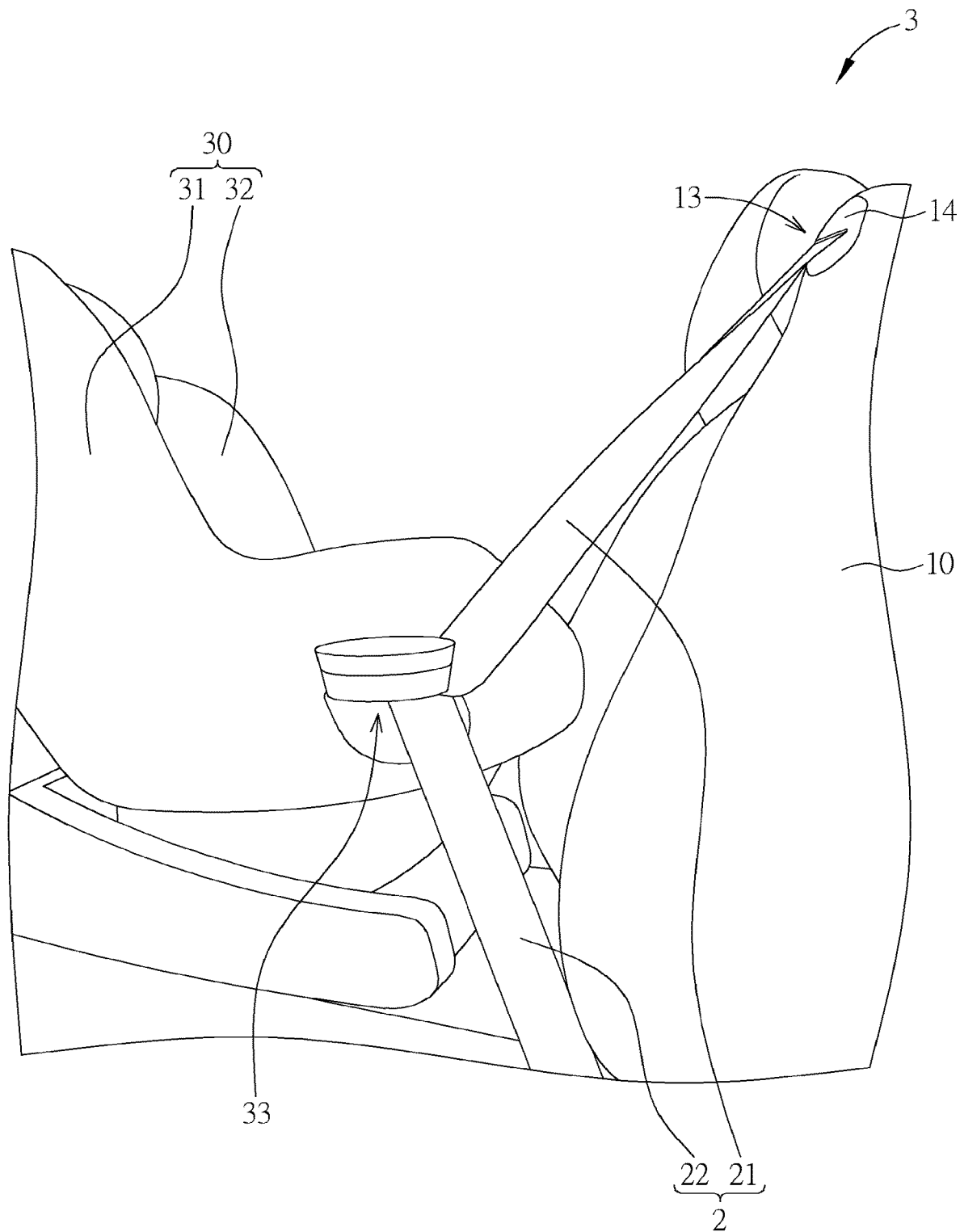
FIG. 2 is a side view of the vehicle seat in FIG. 1 fastening a car seat.

Please refer to FIG. 1 and FIG. 2. FIG. 1 is a front view of a vehicle seat with a seat belt and FIG. 2 is a side view of the vehicle seat in FIG. 1 fastening a car seat. The vehicle seat 1 of a vehicle is equipped with a three-point seat belt and has a retractor 14 at a shoulder part 13 of a backrest 10, a receiver 15 at a first waist part 11 of the backrest 10 diagonal to the shoulder part 13, and a seat belt 2, i.e., a belt set, extending from the retractor 14 and fixed to a second waist part 12 of the backrest 10 opposite to the first waist part 11. The seat belt 2 has a shoulder belt 21 and a lap belt 22 connected to each other via a buckle 23. The shoulder belt 21 extends from the retractor 14 and is connected to the lap belt 22 and the lap belt 22 is further connected to the second waist part 12. The buckle 23 is provided to be locked by the receiver 15 so as to form the three-point configuration: from the shoulder part 13, the first waist part 11, and the second waist part 12 with the shoulder belt 21 extending across a passenger's front body and the lap belt 22 extending across the lap of the passenger. In FIG. 2, a car seat 3, whose seat shell 30 has a belt path 33 connecting to two opposite sides, a first side 31 and a second side 32, of the seat shell 30, is placed on the vehicle seat 1 and fastened to the vehicle seat 1 via the seat belt 2 goes through the belt path 33 with the buckle 23 received and locked by the receiver 15.

Figure 3:
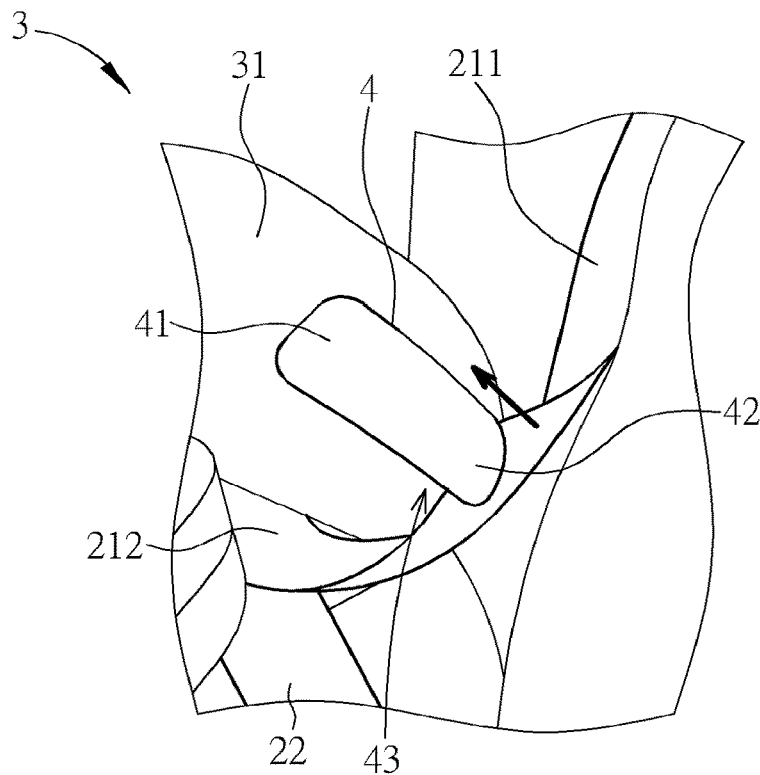
FIGS. 3-5 are illustrations showing a first embodiment of car seat with belt guide according to the invention.
Figure 4:
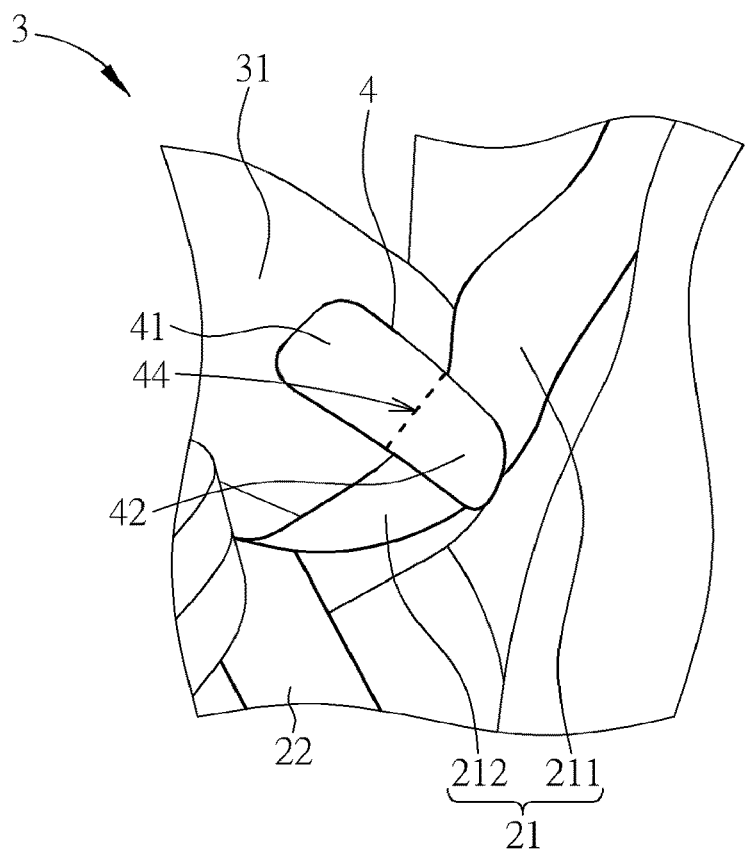
Figure 5:
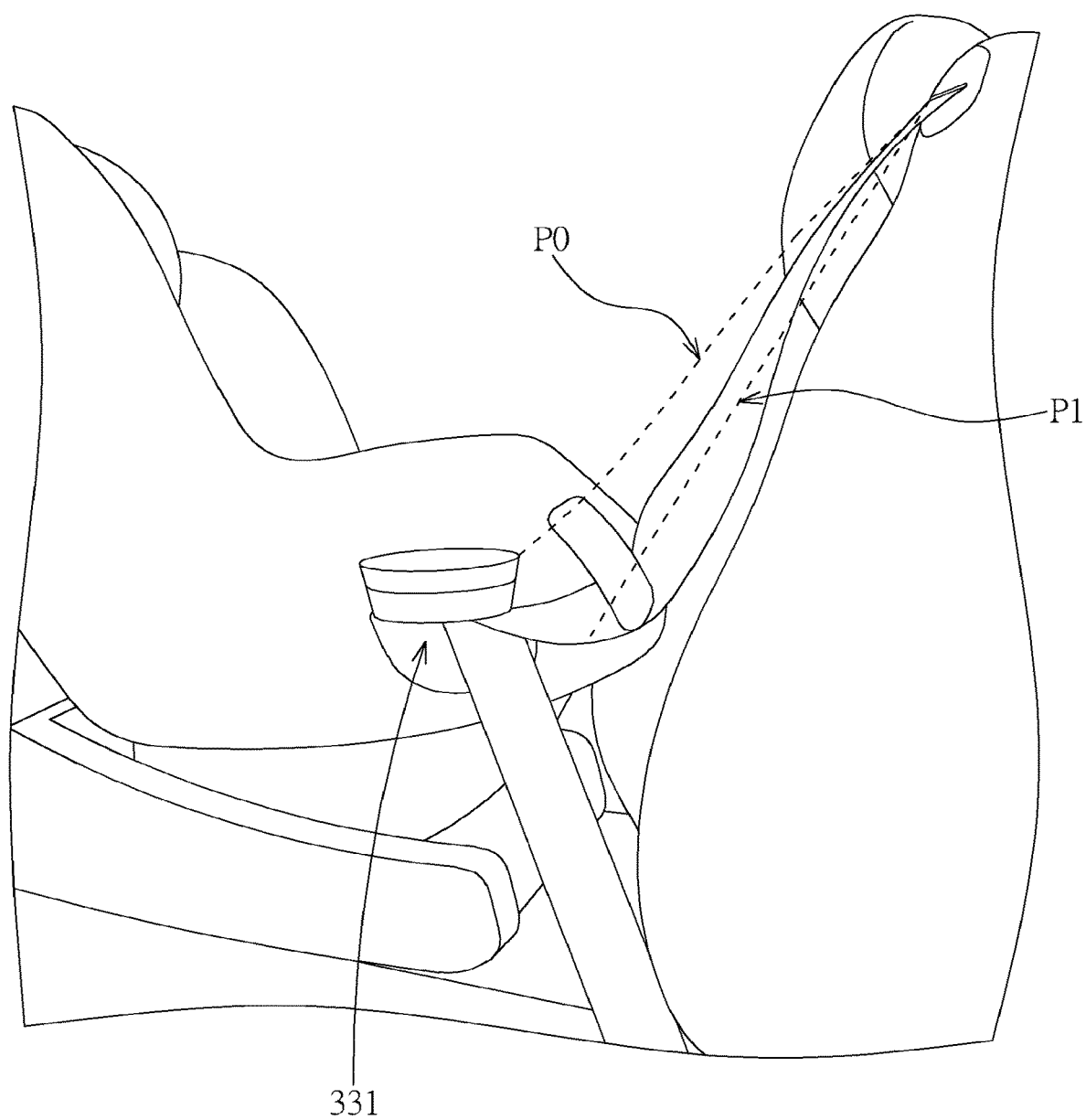
Figure 6:
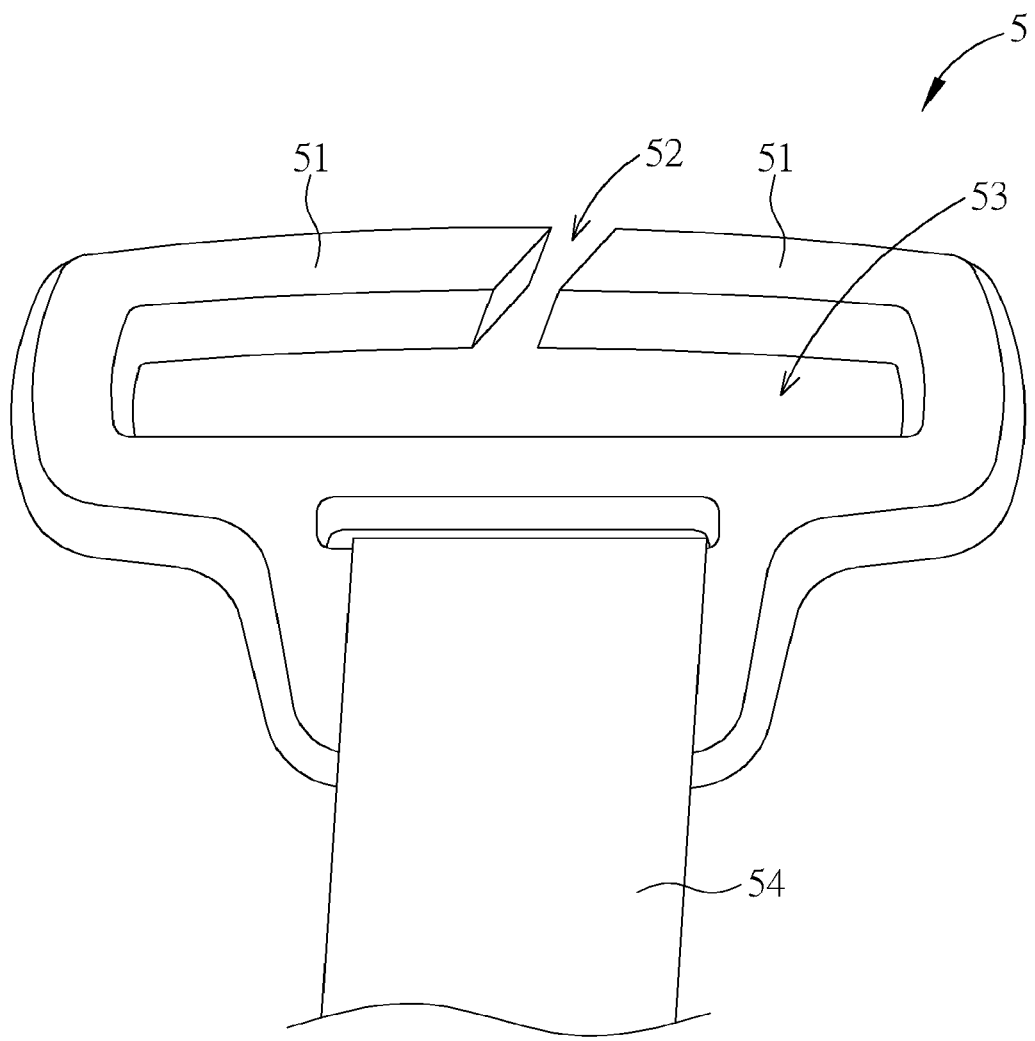
FIGS. 6-9 are illustrations showing a second embodiment of car seat with belt guide according to the invention.
Figure 7:
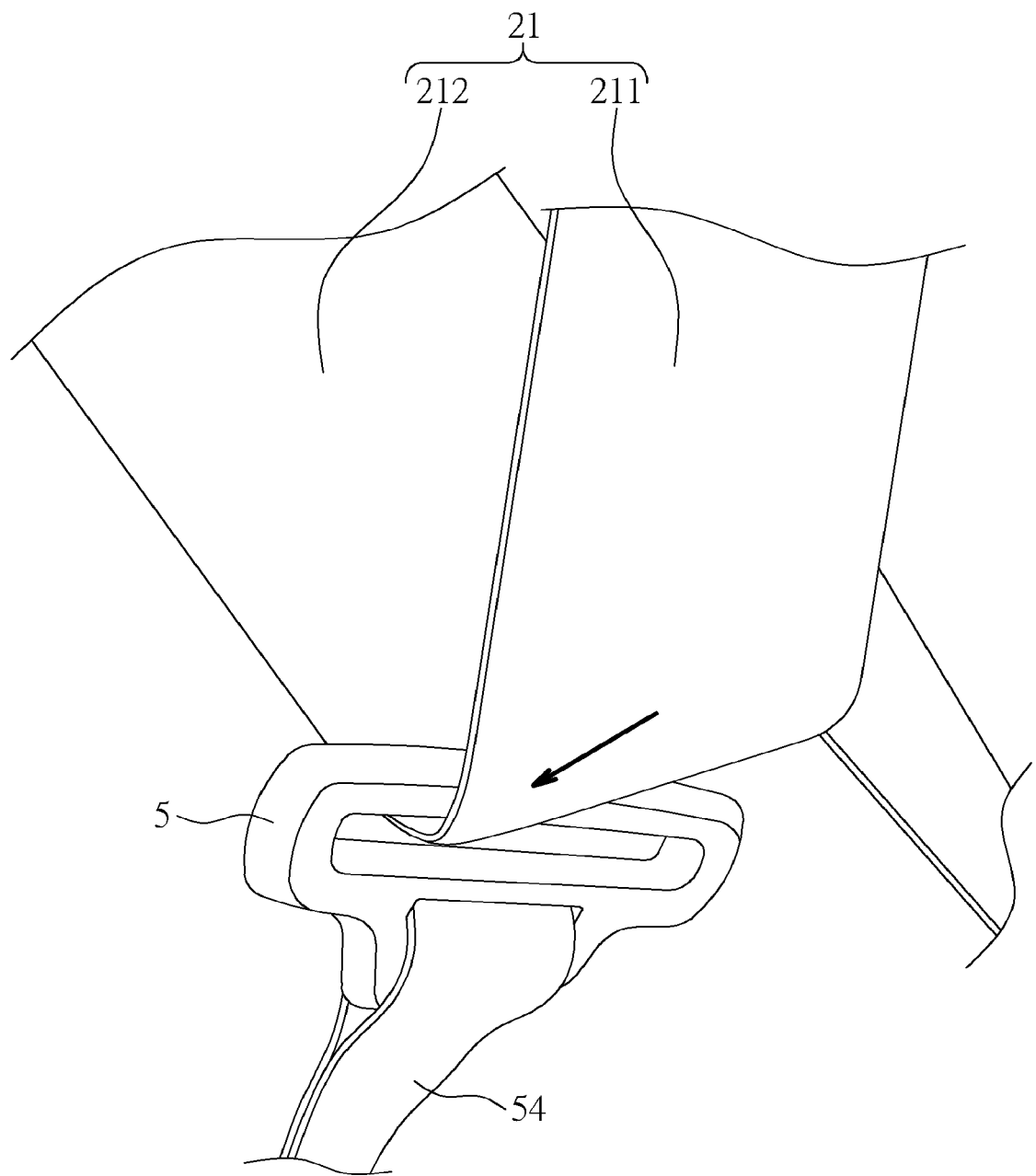
Figure 8:
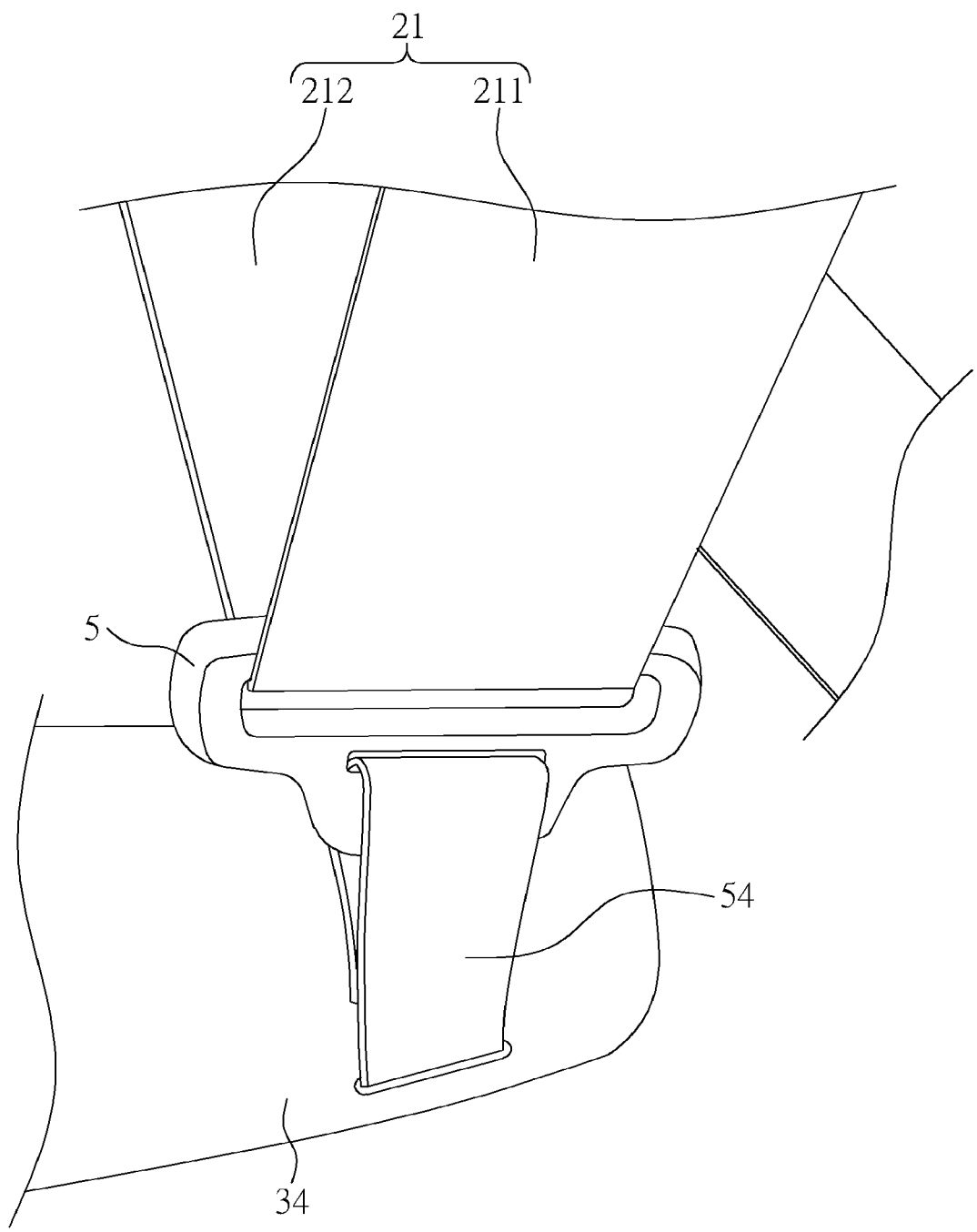

Please refer to FIG. 3 to FIG. 5, which are illustrations showing a first embodiment of car seat with belt guide according to the invention. The car seat 3 includes the seat shell 30 the same as what is depicted and described in FIG. 2, and a belt guide 4 disposed at the first side 31 of the seat shell 30 and neighboring the belt path (referring to FIG. 2) for redirecting the shoulder belt 21 away from its conventional path. In detail, the shoulder belt 21 as a portion of the seat belt 2, can be divided into a first section 211 and a second section 212 when used to fasten the car seat 3 along with the lap belt 22. The lap belt 22 along with the second section 212 goes through the belt path 33. The first section 211 extends from the retractor 14 and connects the second section 212 at an inlet 331 of the belt path 33 located at the first side 31 of the car seat 3. Regarding to a conventional fastening configuration, the first section 211 of the shoulder belt 21 extends from the retractor 14 to the inlet 331 following an original path P0 connecting directly between the retractor 14 and the inlet 331.

Referring to FIG. 3, the belt guide 4 of the first embodiment is fixed at the first side 31 of the seat shell 30 with one end 41 located above the original path P0 (referring to FIG. 5). An open channel 43 is formed between the other end 42 of the belt guide 4 and the seat shell 3, where the first section 211 of the shoulder belt 21 can be slipped in the open channel 43 (as shown in FIG. 3) until stopped by the end 41 at a stop location 44 (as shown in FIG. 4). For an exemplary embodiment, the plastic injection molded belt guide 4 changes/redirects the path of the first section 211 to deviate from the focal belt path, the original path P0, toward the backrest 10 of the vehicle seat 1 following a first path P1, i.e., a deviation path. When the shoulder belt 21 is slipped between the belt guide 4 and the seat shell 3, the belt guide 4 holds the first section 211 of the shoulder belt 21 forward towards the backrest 10 and out of alignment with the retractor 14. The belt guide 4 is a rigid structure that does not release the shoulder belt 21 in the event of a vehicular collision. Hence, the first embodiment of the invention improves the kinetics of the car seat 3 while maintaining an ease of installation. The user is only required to perform one simple step in addition to the tradition methods of installation.

Figure 9:
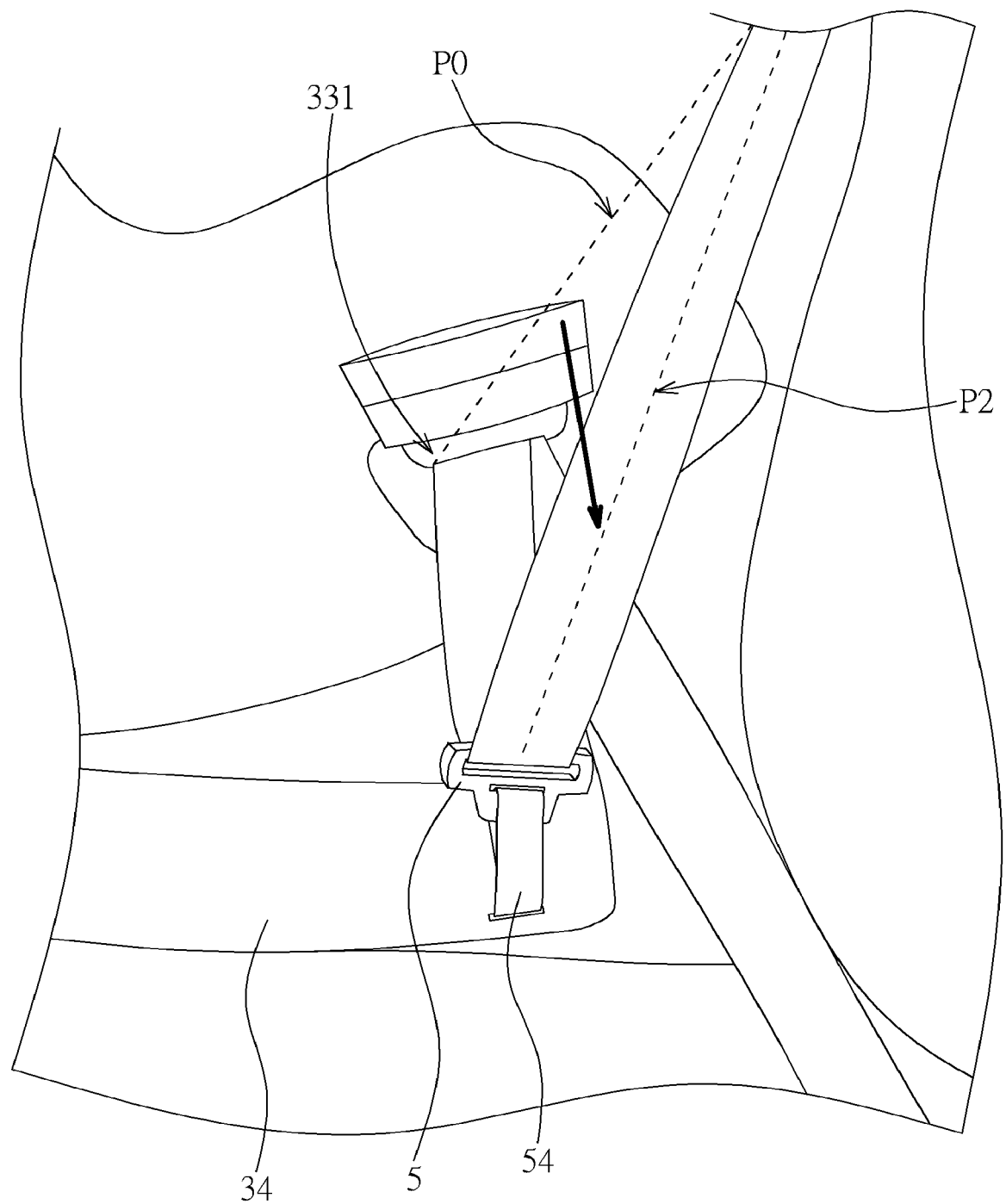
Figure 10:
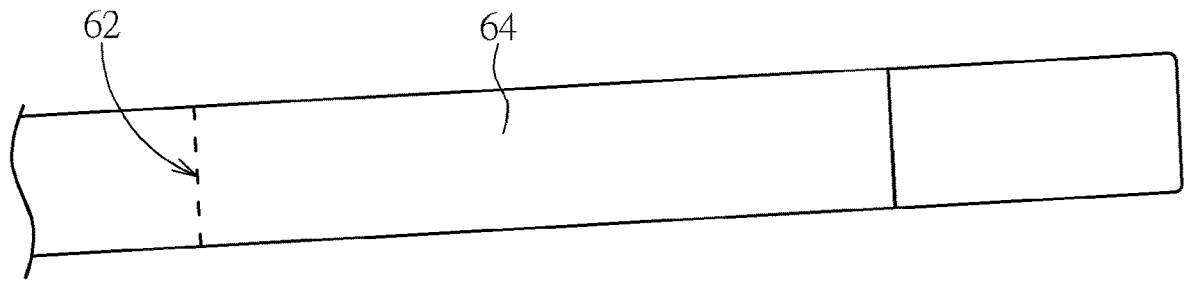
FIGS. 10-13 are illustrations showing a third embodiment of car seat with belt guide according to the invention.
Figure 11:
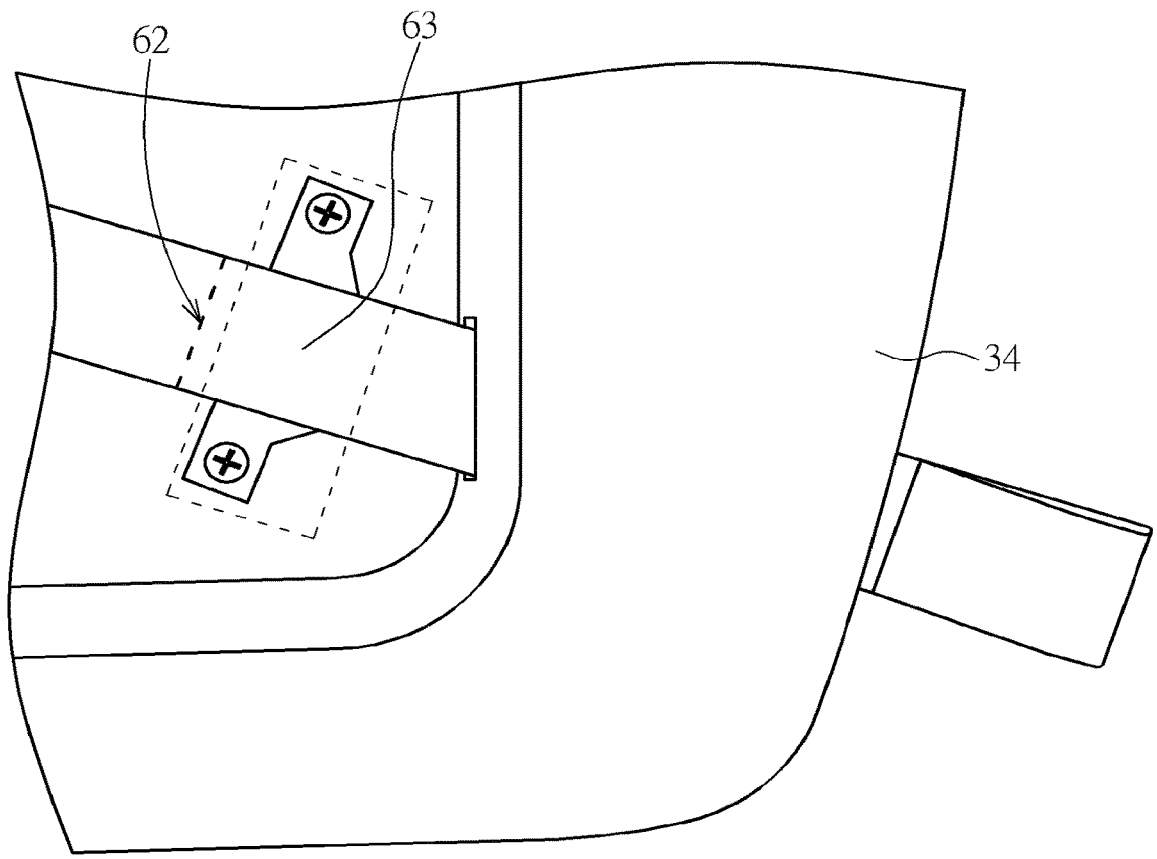
Figure 12:
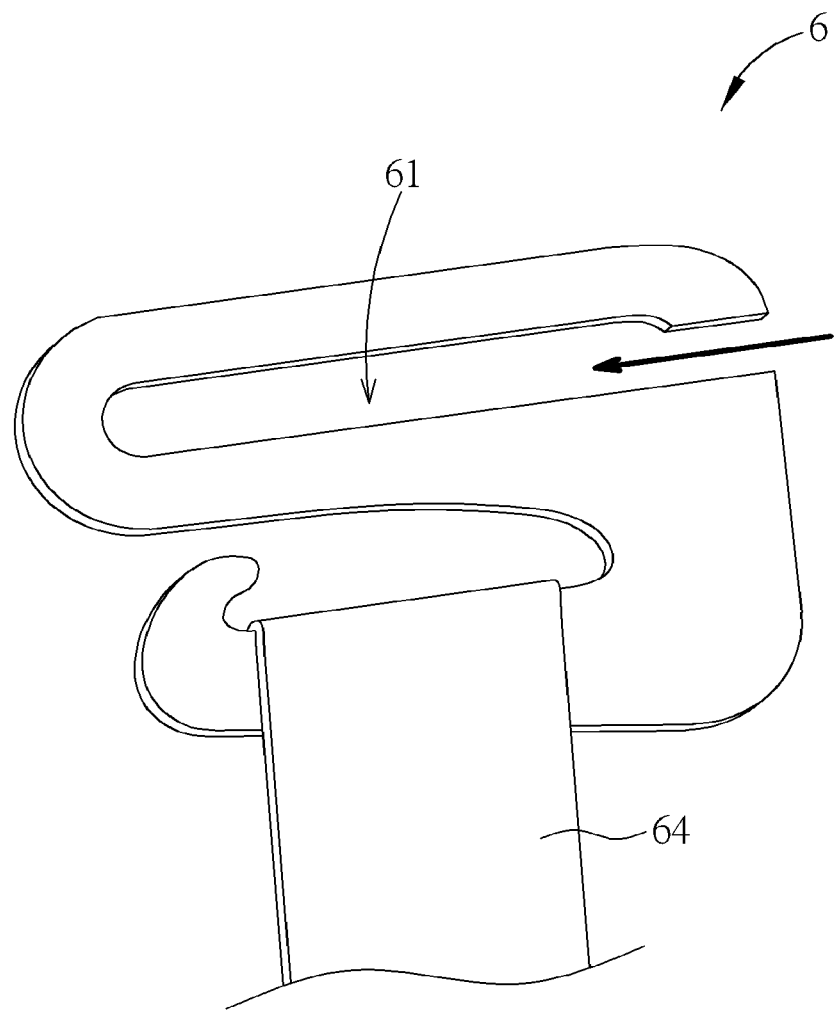
Figure 13:
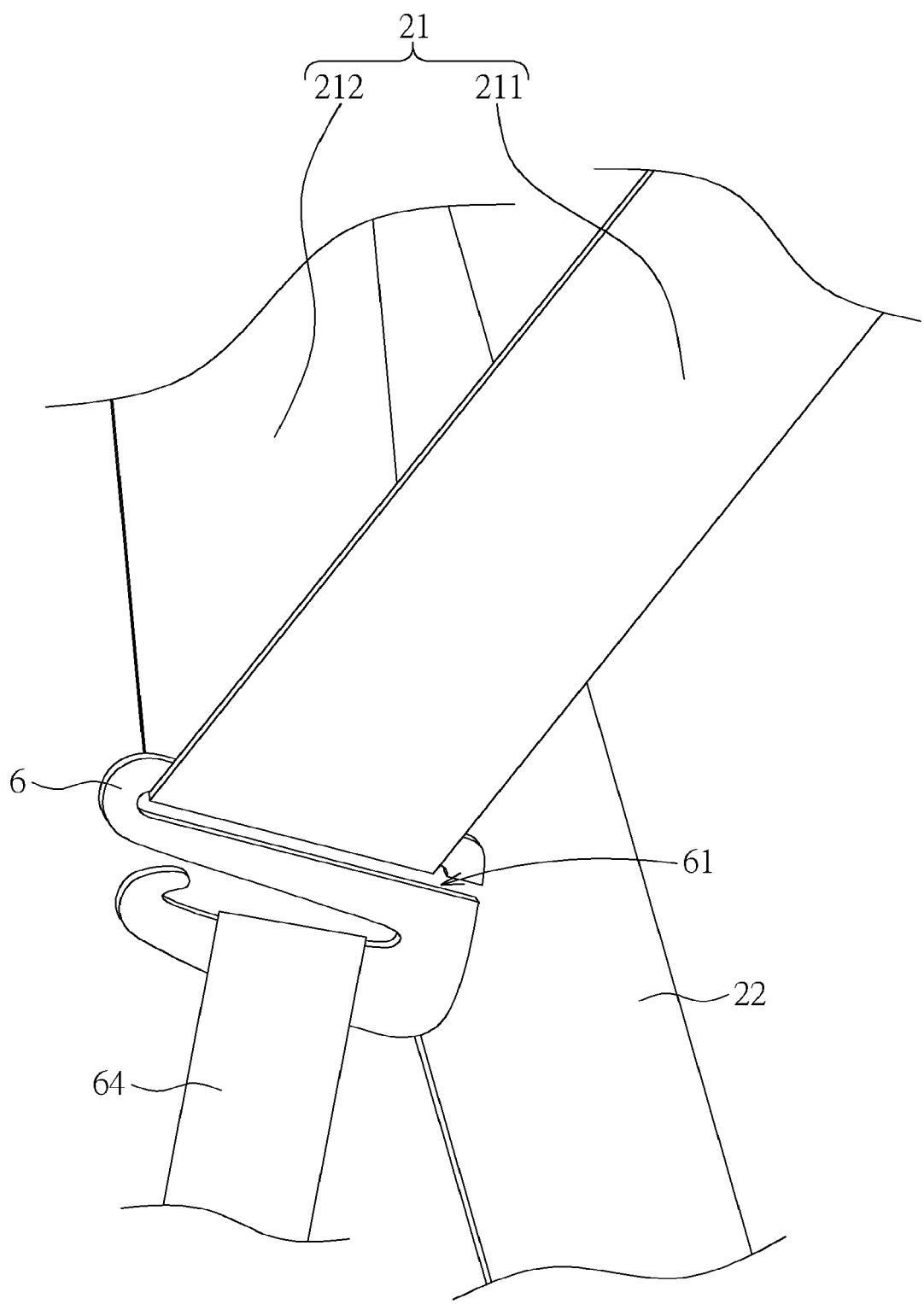

Please refer to FIG. 6 to FIG. 9, which are illustrations showing a second embodiment of car seat with belt guide 5 according to the invention. The second embodiment of the invention redirects the first section 211 of the shoulder belt 2 downward the original path P0 and toward the bottom 34 of the seat shell 30 where the first section 211 is deviated to follow a second path P2, i.e., the deviation path, as shown in FIG. 9. The belt guide 5 is a break-away structure made by plastic injection molding and is anchored to the bottom 34 of the seat shell 30 via a webbing 54. To redirect the first section 211 downward the original path P0, the belt guide 5 is located at the first side 31 of the seat shell 30 between the inlet 331 of the belt path 33 at the first side 31 and the bottom 34 of the seat shell 30. Please refer to FIG. 6. The belt guide 5 includes a receiving slot 53 and two support beams 51 where a slit 52 is formed between the two support beams 51 and provided as a channel for the receiving slot 53. During installation, the shoulder belt 21 and the lap belt 22 are threaded through the original belt paths in the same way as a traditional car seat, and the next step will be to place the first section 211, first slipping the first section 211 through the slit 52, into the redirecting receiving slot 53. The first section 211 can then be contained in the receiving slot 53 and redirected by the belt guide 5 to deviate from the original path P0 toward the bottom 34 of the seat shell 30 following the second path P2. In the second embodiment, the material and part geometry of the two support beams 51 of the belt guide 5 can be tuned to be breakable at a predetermined force, allowing the seat belt 2 to release during an accidental overload or a vehicular crash.

Please refer to FIG. 10 to FIG. 13, which are illustrations showing a third embodiment of car seat with belt guide 6 according to the invention. The third embodiment is similar to the previous embodiment by utilizing a sacrificial sew line. The belt guide 6 of the third embodiment is a rigid structure made of metal with an open slot 61. The first section 211 of the shoulder belt 21 is slipped and contained in the opened slot 61 that does not release the seat belt 2 during a crash. For the third embodiment, the first section 211 is also redirected by the belt guide 6 to deviate from the original path P0 toward the bottom 34 of the seat shell 30 following the second path P2 as referred in FIG. 9. The belt guide 6 is also anchored to the bottom 34 of the seat shell 30 via a webbing 64 where the webbing 64 includes a rigid member 63 connected to the bottom 34 and a sacrificial sew line 62 between the rigid member 63 and the belt guide 6. The sacrificial sew line 62 is tuned to have shape that is breakable at a predetermined force to create a length of slack before a hard-stop is encountered. The installation and benefits of this embodiment are comparable to the previous embodiment.

Figure 14:
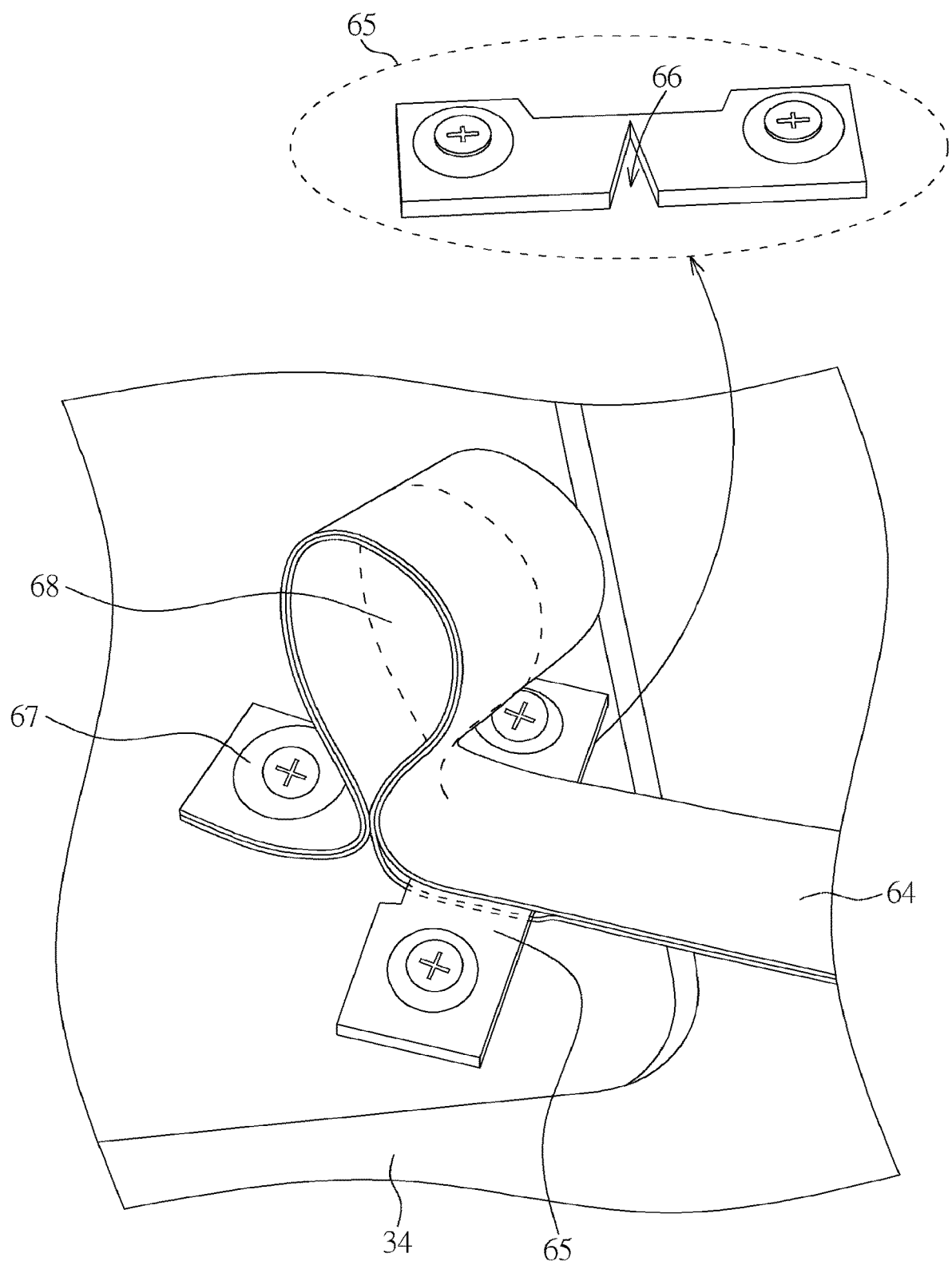
FIG. 14 is an illustration showing a fourth embodiment of car seat with belt guide 6 according to the invention.

Please refer to FIG. 14, which is an illustration showing a fourth embodiment of car seat with belt guide 6 according to the invention. The fourth embodiment utilizes the same ridged belt guide 6 from the third embodiment while integrating a sacrificial break-away tab 65. The break-away tab 65 is fixed at the bottom 34 of the seat shell 30, the webbing 64 is sewed to the break-away tab 65 to form a slack section 68 between the break-away tab 65 and a riveted end 67 of the webbing 64. The break-away tab 65 is made by injection molded plastic that has a notch 66 cut in the center where the webbing 64 is sewed to the center of the break-away tab 65. The notch 66 allows the plastic to break during a vehicular crash so that a length of the slack section 68 can be let out. After the slack section 68 is released, the riveted end 67 of the webbing 64 creates a hard-stop that does not allow any further extension of the webbing 64. The sacrificial break-away tab 65 can be tuned to be breakable at a predetermined force. In this way, the fourth embodiment has similar advantages and installation methods as the previous embodiment. The materials depicted in each embodiment of the invention can be changed to include other embodiments of similar construction.

The embodiments of the invention provide a car seat with belt guide disposed at the side of the seat shell for redirecting the shoulder belt when the car seat is installed on the vehicle seat, passed and fastened by the seat belt of the vehicle seat. The redirection of shoulder belt improves the symmetry of forces encountered by the vehicle seat and also improves the kinetics of the car seat during a crash. A break-away feature in the belt guide advantageously absorbs forces at different times during a crash. All the embodiments distribute the forces of impact so that they are not localized at the belt path.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. A car seat, configured to be fastened to a vehicle, the car seat comprising:
    a seat shell having a first side and a second side, and a belt path extending between the first side and the second side; and
    a belt guide disposed at the first side of the seat shell operable to redirect a belt set of the vehicle, the belt guide being anchored to the seat shell;
    wherein the belt guide comprises at least one support beam that defines a receiving slot, wherein the at least one support beam provides a break-away structure breakable at a predetermined force.

2. The car seat of claim 1, wherein a portion of the belt set is engageable with the belt guide, the portion of the belt set in engagement with the belt guide being routed along a deviation path from an original path.

3. The car seat of claim 2, wherein the belt guide is fixed at the seat shell, and an open channel is formed between the belt guide and the seat shell, the portion of the belt set is receivable within the open channel for rerouting the portion of the belt set along the deviation path from the original path.

4. The car seat of claim 1, wherein the belt guide is a rigid structure made by injection molding.

5. The car seat of claim 1, wherein the at least one support beam comprises two support beams, the two support beams defining a slit therebetween that connects to the receiving slot, wherein a portion of the belt set is insertable into the receiving slot via the slit.

6. The car seat of claim 5, wherein the two support beams provide the break-away structure breakable at the predetermined force.

7. The car seat of claim 1, wherein the belt guide comprises a guide body and a webbing anchoring the guide body to the seat shell.

8. The car seat of claim 7, wherein the guide body is a rigid structure with an open slot, wherein a portion of the belt set is receivable within the open slot.

9. The car seat of claim 8, wherein the webbing comprises a rigid member connected to the seat shell and a sacrificial sew line between the rigid member and the guide body, and the sacrificial sew line being breakable at the predetermined force to create a length of slack before a hard-stop is encountered.

10. The car seat of claim 8, wherein the guide body is made of metal.

* * * * *